(12) United States Patent
Kuehn

(10) Patent No.: US 6,702,978 B1
(45) Date of Patent: Mar. 9, 2004

(54) PROCESS FOR MANUFACTURING A PLASTIC TUBE BODY

(76) Inventor: Hans Kuehn, Schmidbachstrasse 9, 76467, Bietigheim (DE)

( * ) Notice: Subject to any disclaimer, the term of this patent is extended or adjusted under 35 U.S.C. 154(b) by 0 days.

(21) Appl. No.: 09/171,965
(22) PCT Filed: Apr. 30, 1997
(86) PCT No.: PCT/EP97/02224
§ 371 (c)(1), (2), (4) Date: Oct. 30, 1998
(87) PCT Pub. No.: WO97/40972
PCT Pub. Date: Nov. 6, 1997

(30) Foreign Application Priority Data

Apr. 30, 1996 (DE) .......................... 196 17 349

(51) Int. Cl.$^7$ .............................................. B29C 45/16
(52) U.S. Cl. ..................... 264/513; 264/524; 264/537
(58) Field of Search .................. 264/513, 537, 264/524, 328.8, 515; 222/107; 425/130

(56) References Cited

U.S. PATENT DOCUMENTS

| | | | |
|---|---|---|---|
| 2,562,523 A | | 7/1951 | Brunet |
| 2,710,987 A | * | 6/1955 | Sherman ..................... 264/513 |
| 3,337,666 A | * | 8/1967 | Wilkins ...................... 254/521 |
| 3,855,380 A | | 12/1974 | Gordon et al. |
| 4,011,968 A | * | 3/1977 | McGhie et al. ............. 222/107 |
| 4,397,808 A | * | 8/1983 | Yoshino et al. ............ 264/521 |
| 4,526,821 A | * | 7/1985 | McHenry et al. ........ 206/524.6 |
| 5,407,629 A | * | 4/1995 | Schmidt et al. ............. 264/512 |
| 5,511,686 A | * | 4/1996 | Gallay ........................ 220/667 |
| 5,674,448 A | * | 10/1997 | Slat et al. ................... 264/513 |
| 5,688,570 A | * | 11/1997 | Ruttinger, Sr. ............. 264/537 |
| 5,816,451 A | * | 10/1998 | Renault ...................... 222/215 |
| 5,823,391 A | * | 10/1998 | Klauke et al. ................ 222/94 |
| 5,888,598 A | * | 3/1999 | Brewster et al. ........... 428/35.7 |

FOREIGN PATENT DOCUMENTS

| | | | |
|---|---|---|---|
| DE | 14 79 790 A | 9/1969 | |
| EP | 0 170 594 B1 | 2/1986 | |
| EP | 0 170 594 A | 2/1986 | |
| EP | 0199633 | * 10/1986 | ................. 264/513 |
| EP | 0 302 177 A | 2/1989 | |
| EP | 0 325 440 A2 | 7/1989 | |
| EP | 0 374 247 A1 | 6/1990 | |
| EP | 0 380 215 A3 | 8/1990 | |
| EP | 0 537 346 A1 | 4/1993 | |
| EP | 0 585 846 A | 3/1994 | |
| EP | 0 677 374 A | 10/1995 | |
| FR | 2 545 448 A | 11/1984 | |
| GB | 2 191 730 A | 12/1987 | |

OTHER PUBLICATIONS

Neue Verpackung, Gasdicht trotz Durchsicht, Oct. 1991, pp. 68, 70.
Süddeutsches Kunststoffzentrum, Mar. 1991, p. 3.12.

* cited by examiner

Primary Examiner—Michael W. Ball
Assistant Examiner—Barbara J Musser
(74) Attorney, Agent, or Firm—Renner, Otto, Boisselle & Sklar, LLP

(57) ABSTRACT

The present invention comprises a method for producing a tube preform using an injection moulding method. The inventor of the present invention has found that in the case of using an injection moulding method to produce tube preforms which can be constructed with either one layer or a plurality of layers, and of subsequent extension, in particular by heating the preform, and biaxial expansion by means of compressed air, a tube can be obtained which, on the one hand, has a tube shoulder with the strength required by industrial thread and, on the other hand, has a lateral surface which exhibits the softness desired for a tube.

15 Claims, 5 Drawing Sheets

FIG. 2B
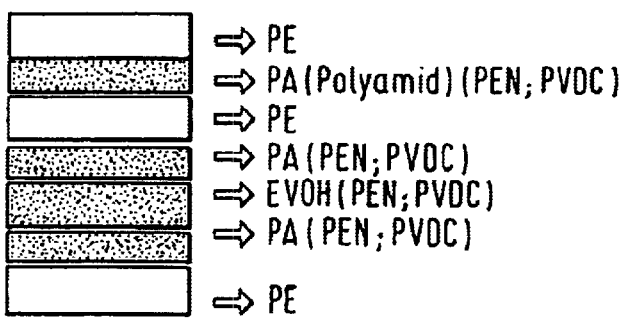
⇒ PE
⇒ PA(Polyamid)(PEN;PVDC)
⇒ PE
⇒ PA(PEN;PVDC)
⇒ EVOH(PEN;PVDC)
⇒ PA(PEN;PVDC)
⇒ PE
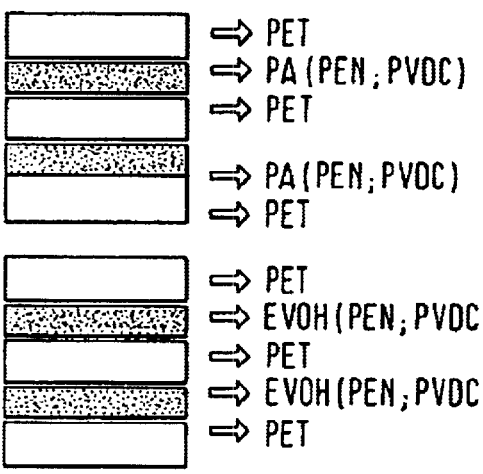
⇒ PET
⇒ PA(PEN;PVDC)
⇒ PET
⇒ PA(PEN;PVDC)
⇒ PET
⇒ PET
⇒ EVOH(PEN;PVDC)
⇒ PET
⇒ EVOH(PEN;PVDC)
⇒ PET
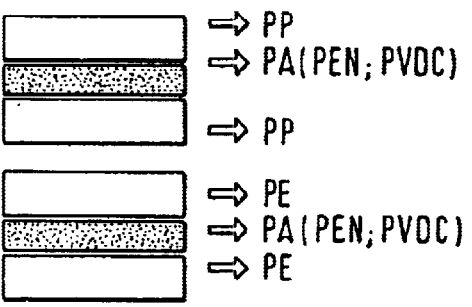
⇒ PP
⇒ PA(PEN;PVDC)
⇒ PP
⇒ PE
⇒ PA(PEN;PVDC)
⇒ PE
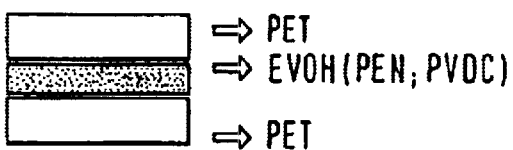
⇒ PET
⇒ EVOH(PEN;PVDC)
⇒ PET
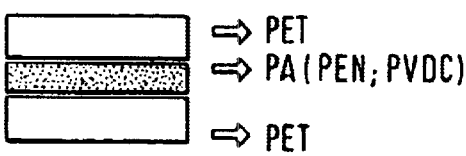
⇒ PET
⇒ PA(PEN;PVDC)
⇒ PET

PROCESS FOR MANUFACTURING A PLASTIC TUBE BODY

TECHNICAL FIELD

The present invention relates to plastic tube bodies and to a method for producing them. In particular, the present invention relates to a method for producing plastic tube bodies, in accordance with which, firstly so-called tube preforms are produced and then formed into the final tube shape at a later point in time.

PRIOR ART

Various methods with which plastic containers can be produced, for example, from a thermoplastic are known in the prior art. Various methods well known to the person skilled in the art are used for this, such as injection moulding, blow moulding, laminating methods, polyfoil and coextrusion methods.

An appropriate selection of material is made on the basis of the various properties of the components with which the container is later to be filled. In addition to the price and obvious parameters such as strength, etc., criteria for selecting the material also include the aggressivity or the volatility of the component, or a desired inert behaviour between the component and container, as is mostly necessary with medical active substances.

The diffusing out of one or more active substance components is extremely undesirable precisely in the case of containers for medical or pharmaceutical components, since the loss of the volatile components means that the percentage quantitative composition no longer corresponds to the original data, with the result that a medically prescribed dosage, which is based on the original composition of the agent is no longer guaranteed.

Furthermore, when volatile components serving as solvents diffuse out there registers a change in the consistency which can lead to more rapid ageing due to drying out or to a poorer applicability.

Since, however, individual materials are able only rarely to fulfil all the requirements placed on them (such as, for example, good compatibility with the component and impermeability for specific volatile constituents thereof), consideration has already been given to various components for multilayer containers (in particular tubes) in which the various layers can consist of different materials. For example, such multilayer containers are produced by calendering methods in which the various materials are extruded and calendered in a role configuration, that is to say rolled to form films or multi-layer films. The films produced in this way are then welded to shoulder pieces and/or sealing pieces produced, for example, by means of an injection moulding method.

However, such shoulder pieces or sealing pieces do not have the properties of the multi-layer film, since they have been produced in a conventional way by means of injection moulding methods and consist of only one material layer.

A further possibility for achieving complete protection against diffusion is to provide cost-intensive metal containers which are complicated to produce and constitute a natural diffusion barrier because of the molecular density of metal. These metal containers can be provided with an additional layer in the interior, in order to ensure an inert behaviour between the fluid and container wall. However, not only is the production of metal containers very much more complicated than the fabrication itself because of very many individual steps (rolling, coating with plastic, forming the containers, folding and flanging the longitudinal seam, etc.), but fabrication times and material costs are also substantially higher.

It has already been considered for this reason to produce multilayer plastic containers by using a multilayer injection moulding method. Such a method is disclosed, for example, in EP 0 537 346 A1. The first step in this method is to inject a so called enveloping layer into the injection mould, followed by, or simultaneously with a so-called core layer which has previously been foamed by using a foaming agent. The result of this is a container with a two-layer wall whose components consist of different materials.

A further problem to be considered in producing plastic containers is the transportation size of the containers. To be specific, the plastic containers are frequently not produced in the company where they are later filled with the component, but by a supplier at a different location. Since, depending on the application, plastic containers are of considerable size but scarcely have any weight, a transportation problem arises to the extent that in relation to the weight of the goods to be transported, the freight charges are also calculated, in particular, with reference to the volume of the goods. Consequently, with large-volume (empty) containers transportation entails substantial costs since, for example, a lorry is essentially transporting "air".

For this reason, it has already been proposed to supply plastic containers to the consumer not in their final form but in the form of so-called preforms. EP 0 374 247 A1 and EP 0 325 440 A2 may be named as examples in this connection. Injection moulding methods for producing multilayer container preforms are described in these documents.

An example of plastic containers are tubes which are presently widely used, for example in the field of medicine, in cosmetics, for dental care agents and in nutrition.

In addition to a tube closure, usually produced using an injection moulding method, plastic tubes comprise a tube body. Two different requirements are made of this body. Firstly, the tube body must have a firm tube shoulder region which, having been provided with a screw thread, must have the required strength to seal the tube reliably with the tube closure. It is to be borne in mind here that—by contrast with plastic bottles—use is made in the case of tubes of industrial threads which are not positively disengaged but are turned out of the mould. Moreover, the tube body must have a lateral surface which gives the later user the required "feeling of a tube", specifically a sufficiently soft consistency which permits the mostly highly viscous component to be completely evacuated by being squeezed out.

To date, tube bodies have been produced in two different ways which are known in the prior art as the "KMK" method and the "AISA" method. These two methods are described below with reference to FIGS. 4A and is 4B.

The "KMK" method is represented diagrammatically in FIG. 4A. As may be gathered from the representation, a cylindrical tube 600, which corresponds to the later tube lateral surface, is introduced into a mould cavity 500. The tube 600 can consist of a (multilayer) film which has been produced using the calendering method explained above, and has been welded at the seam 610 to a tube. After the tube 600 has been moved into the cavity 550 of the mould 500, the later plastic 510, forming the tube shoulder, is introduced into the mould cavity 550 as a "sausage" running round in the shape of a circle. In a subsequent step, the tube shoulder is then formed by a punch 520 which is lowered into the mould cavity 550 of the mould 500.

In accordance with the "AISA" method represented diagrammatically in FIG. 4B, a tube lateral surface 600 (which can be produced as previously described in connection with the KMK method) is introduced into an already prefabricated tube shoulder 550'. This tube shoulder 550' can have been produced previously in the injection moulding method. The elements of tube shoulder 550' and tube lateral surface 600 thus assembled are then welded, for example by means of high frequency or hot air.

Both of the previously mentioned methods ensure that the tube body produced meets the various requirements made of the tube shoulder and tube lateral surface. Disadvantages of these production methods consist in that it is a relatively complicated and cost-intensive matter to produce the tubes, which can be moved to the filling operation only at their final size, which means they require a substantial transportation volume.

It is therefore the object of the present invention to create a method for producing fillable plastic tube bodies in which the containers produced can, on the one hand, be manufactured simply and cost-effectively in terms of production engineering and, on the other hand, can be moved to the final filler in a space saving fashion.

SUMMARY OF THE INVENTION

In its widest sense, the invention comprises a method for producing a tube preform using an injection moulding method.

The inventor of the present invention has found that in the case of producing tube preforms using an injection moulding method and of subsequent extension, in particular by heating the preform and biaxial expansion a tube can be obtained whose tube shoulder, on the one hand, has the strength required for an industrial thread, and whose lateral surface, on the other hand, exhibits the softness desired for a tube.

In accordance with a first preferred embodiment of the present invention according to Claim 1, the first step is advantageously to produce a tube body preform which has a shoulder region, open towards the interior of the tube body preform, and a closed end region. The tube body preform produced in such a way can then be transported to the filler, where it is first heated in a first method step, and then brought into its final shape and size with the aid of biaxial expansion. Finally, in a last method step the closed end region of the tube body is cut open in order in this way to permit the plastic tube to be filled with the desired component. The use of biaxial expansion (by contrast with the axial expansion in the case of cold stretching, for example) renders it possible to use transparent tube materials which exhibit a glass-like transparency even in the expanded state.

The biaxial expansion of the tube body preform in accordance with Patent Claim 2 is advantageously performed by means of compressed air in a blowing method, only the tube lateral surface being expanded; the tube shoulder stays in its original shape. The is biaxial expansion thus effected renders it possible to produce a tube with a tube lateral surface which is distinguished to a particular extent by the desired "feeling of a tube", that is to say as the required softness. Furthermore, the tube lateral surface produced in such a way exhibits particular strength.

In accordance with Patent Claim 3, the tube body preform is advantageously produced using an injection moulding method. This permits the tube body preform to be produced in an extremely cost-effective way and with a high quality.

If the biaxial expansion of the tube preform is performed with compressed air, in accordance with Patent Claim 4 the prior heating of the preform can advantageously be performed using infrared light.

If the plastic tube according to the invention is, for example, to be printed with a product designation, in accordance with Patent Claim 5 this takes place after the expansion of the preform, and advantageously after the closed end region of the tube body has been cut open.

In accordance with a further advantageous embodiment of the present invention according to Claim 7, the plastic body preform according to the invention has a closed end region. This permits the particularly advantageous biaxial expansion of the tube body preform by means of compressed air using a blowing method.

In accordance with a further advantageous embodiment of the present invention according to Claim 8, the inventive tube preform is of multilayer design. Use is made for this purpose of an injection moulding line having at least two feeding containers, different materials being introduced into the feeding containers. After the materials have been plasticized, they are pressed into an annular nozzle with concentrically arranged annular nozzle gaps, the delivery rates of the materials being substantially the same in terms of direction and magnitude, with the result that the homogeneity of the first and second materials is maintained after they leave the nozzle. The materials thus plasticized are then pressed into a mould cavity of an injection mould, it being the case here, as well, that the homogeneity of the material layers is maintained in the mould cavity. The tube preform produced in this way is then formed into the final tube in a subsequent method step, use advantageously being made for this purpose of the method according to Patent Claim 1. One advantage of these multilayer tube preforms consists in the possibility of producing tubes with already integrated closure and shoulder regions, which are distinguished by being completely multilayered.

The tubes produced from the inventive tube preforms are suitable for multifarious uses such as, for example, for:

Tubes for cosmetic, medical, pharmaceutical and hazardous media or foodstuffs, etc.;

Semi-rigid tubes for cleaning agents, chemicals, biological materials or consumer articles, etc.

The advantages of the tube preforms according to the invention can be enumerated as follows;

A first advantage resides in the very low production costs, since the steps, otherwise required, of inserting shoulder pieces and welding the parts to one another, for example, are no longer required.

Furthermore, in the case of the multilayer tube preforms, the specific dosing of the individual thermoplastic materials renders it possible for cost-intensive constituents to be optimally set, something which can have a substantial effect on the production costs. This may be explained using an example. Consideration is given to a previously known tube whose wall consists of three material layers, the middle layer being an expensive diffusion-inhibiting material. This layer makes up approximately 80–90% of the tube volume; only 10–20% of the tube volume is down to the cost-effective inner and outer layers. If, for example, PE is used as cost-effective outer or inner material (approximately 1.60 DM/kg) and EVOH as the expensive middle material (approximately 12 DM/kg), this would mean material costs of approximately 10.96 DM/kg for an average tube. A reduction in cost to approximately 2.64 DM/kg can be achieved with the method according to the invention by optimizing the use of materials.

A further advantage resides in the fast injection technique for producing preforms, since previous containers have had to be produced by extrusion, a technique which requires equipment which is more cost-intensive and longer production cycles.

A further advantage consists in the possibility of being able to operate a plurality of injection moulds, specifically up to 144, in parallel.

The subclaims are directed at advantageous developments of the invention.

Exemplary embodiments of the present invention are explained below in more detail with reference to the drawing, in which:

FIG. 2B shows a number of possible layer designs of a multilayer preform according to the present invention;

As already explained above, from the widest point of view the invention consists of the idea of firstly using an injection moulding method to produce tube preforms instead of finished tubes. These preforms (or blanks) have the advantage that they can be produced with large savings in material. The reason for this resides in the wall thickness of the tube lateral surface, which is important for the desired softness of the later lateral surface. To be precise, because of the material-specific viscosity of plasticized polymers, it is impossible to inject thermoplastics with less than a specific minimum wall thickness, particularly if multilayer tubes need to be injected.

This problem is solved by the injection moulding of inventive preforms, since the lateral surface of the preform is not injected with the final dimensions of the later tube (only the tube shoulder is injected with the final dimensions). The final dimensions of the preformed lateral surface are reached only by later secondary finishing methods, which are usually carried out only by the consumer of the tube preforms.

The aim below is to describe, with reference to FIG. 1, the principle of the design of an injection moulding apparatus which can be used to produce the inventive tube preforms. It is important here to note that the injection moulding apparatus shown in FIG. 1 is suitable both for producing simple (that is to say single-layer) preforms and for producing the particularly preferred multilayer preforms as will be explained below.

Figure 1:
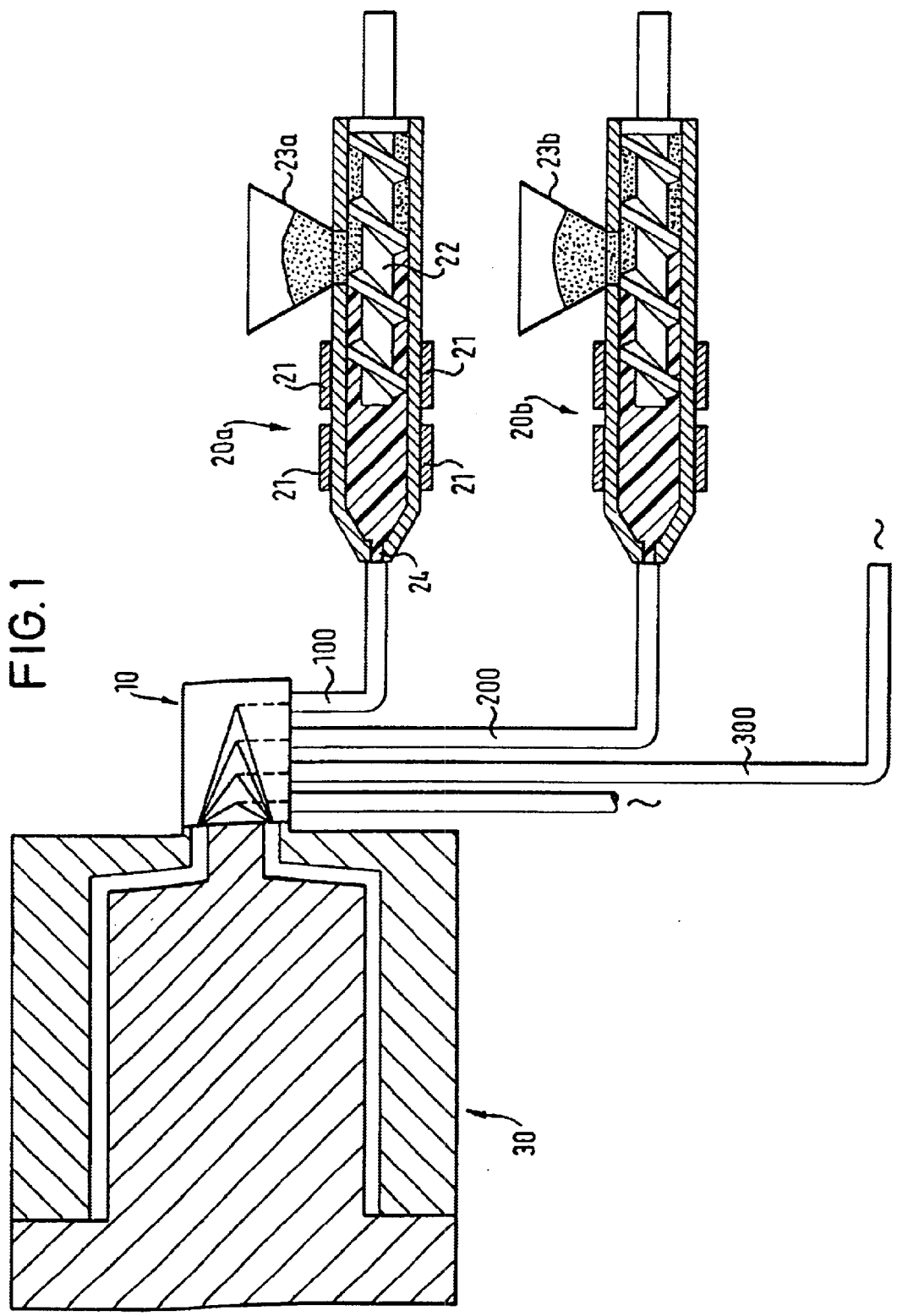
FIG. 1 shows a diagrammatic representation of an injection moulding apparatus for producing the preforms according to the invention.

FIG. 1 represents a multiplicity of feeding devices (20a, 20b, . . . 20i, . . . 20n, which in each case represent integrated devices for conveying, plasticizing and metering thermoplastic materials. The number 20i of the feeding devices is determined by the number of plastics to be used, and by the number of the material layers to be produced. Thus, for example, the production of a single-layer tube requires the use of only one feeding device 20i, which can be filled with a desired material. A two-layer tube (in which the outer layer consists, for example, of PP, and the inner layer of PA) requires the use of two feeding devices 20i in which, respectively, PP or PA are conveyed, plasticized and metered. However, in the case of a three-layer tube, which is to have a further layer made from PP, for example, as inner layer, there is no need to use a further feeding device 20i—it is possible instead to undertake an appropriate subdivision (not represented) of the mass flows inside the lines 100, 200, 300, . . . to the nozzle 10, for example by means of a suitable valve arrangement.

Inside the feeding devices 20i, the material is made available by being introduced into the accumulators 23a, 23b, . . . , 23i, . . . , 23n, and is conveyed by screws 22 into regions 21, in which it is plasticized by the influence of heat.

The plasticized material is fed into a line network 100, 200, 300, in which it continues to be held plasticized by control mechanisms (not represented), with the result that when they reach the injection nozzle 10 the thermoplastic materials are in a state which is optimum for injection moulding methods.

The plasticized materials are introduced into the mutually separated annular gaps 120, 220, 320 (compare FIG. 3) of the nozzle 10 through the inlets which are arranged in the nozzle and communicate directly with the respective lines 100, 200, 300.

The inlet rate and the conveying pressure depend on the respective nozzle geometries, it being necessary inside the nozzle to take account of the shear forces and compressive forces which arise, in such a way that the delivery rate of the individual materials and layers are essentially the same in terms of direction and latitude.

It is possible, through ensuring this feature, for the homogeneity of the various layers to be maintained after-they leave the annular gaps, since the layers do not mix with one another, that is to say the spatial unit of the individual layer components (for example PA, PET, EVOH, etc.) is essentially maintained in a layered fashion, with the result that continuous component layers are to be found.

Figures 2, 2A:
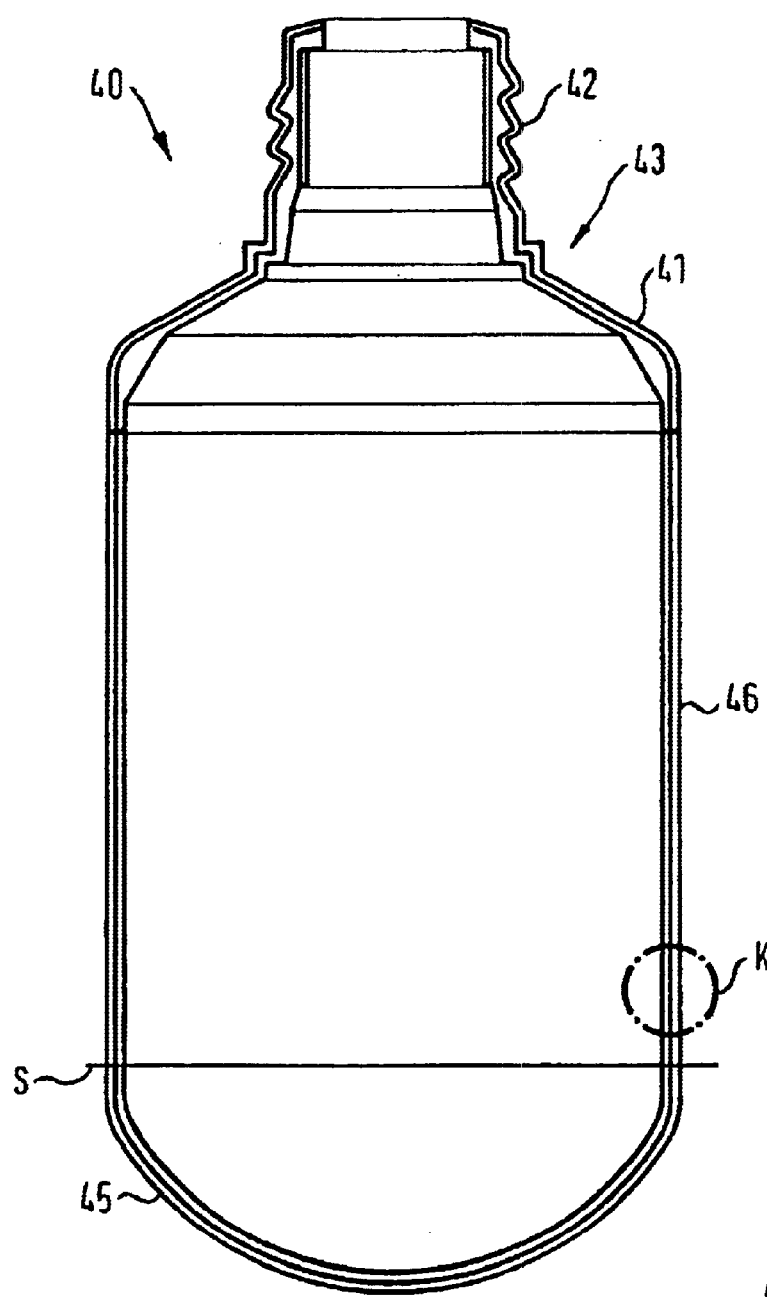
FIG. 2 shows a cross-section through an inventive multilayer preform.
FIG. 2A shows an enlargement of the layered structure in the area denoted by reference character K in FIG. 2.

The material, which is still plasticized, is injected into an injection mould 30 (compare FIG. 1), it being possible to construct the latter in different ways corresponding to the preform to be produced. In the mould 30 represented in FIG. 1, it is to be borne in mind that it permits the production of tube preforms 40 which have an open end region 45 (compare FIG. 2A, a tube preform 40 being represented here which has a closed end region 45). The production of a tube preform 40 with an open end region is advantageous to the extent that the later filling of the finished tube is performed via the end region 45 of the tube 40, the result being an already appropriately open tube. A disadvantage of a tube preform 40 with an open end region 45 consists, however, in that monoaxial expansion methods such as cold-stretching methods are, in particular, the ones which come into consideration for the secondary finishing step to produce the final tube dimensions. These methods have the disadvantage that they place extreme loads on the plastic and lead to increased brittleness of the later tube. Moreover, they have the effect that the lateral surface becomes milky, and thus unattractive, at least for tubes to be used in cosmetics. Consequently, according to the invention, it is regarded as particularly advantageous to produce tube preforms 40 with a closed end region 45 (as represented in FIG. 2A), which can be brought to their final size with the aid of biaxial expansion methods (compare further below in this regard).

The solidification phase, which can be supported by a cooling system in the injection mould 30, begins as soon as the mould 30 is fed the plasticized material.

Since, as a rule, the mould 30 consists of a plurality of parts, opening the mould releases the workpiece such that it can easily be ejected.

Injection moulding technology can be used to connect a multiplicity (up to approximately 40) of injection moulds 30 to the conveying devices 20i, with the result that a high rate of production can be achieved. The number of tube layers to be produced depends on the individual material characteristics, on their various physical properties, and on the specifications of the tubes respectively to be produced.

FIG. 2A shows in cross-section an inventive tube preform which is constructed as a preferred embodiment in three layers. The preform 40 represented has a shoulder region 43 (consisting of the actual tube shoulder 41 and a closure region 42), as well as a lateral surface region 46 which is provided with a closed end part 45. Instead of the thread design represented in the closure region 42, it is also possible to provide another possible closure, for example a hooded cap or a hinged lid.

Common to the shoulder regions and lateral surface regions 43, 46 in the multilayer tube preform represented is the enlarged region represented in the detail K which reproduces the cross-section of the container wall. The detail K shown in FIG. 2A shows a 3-layer wall, but equally possible are double walls or multilayer walls of which a few exemplary combinations are represented in FIG. 2B. What is decisive is that the number of layers is identical in all regions, the container thus being formed in one piece in one production operation.

Different variations of layers are shown in FIG. 2B, the different shadings corresponding to different materials. only a few possible combinations are presented as material combinations.

The thermoplastic materials which can preferably be used for the method are generally polymers such as polyethylene (PE) or polyethylene terephthalates (PET), polyethylene glycol terephthalates or polypropylene (PP). Polyamide (PA) or ethylenevinyl alcohol (EVOH) can be used for possible further layers situated between the inner or outer edge layers. However, it is also possible to use any other plastics which are melt processable.

Figure 3:
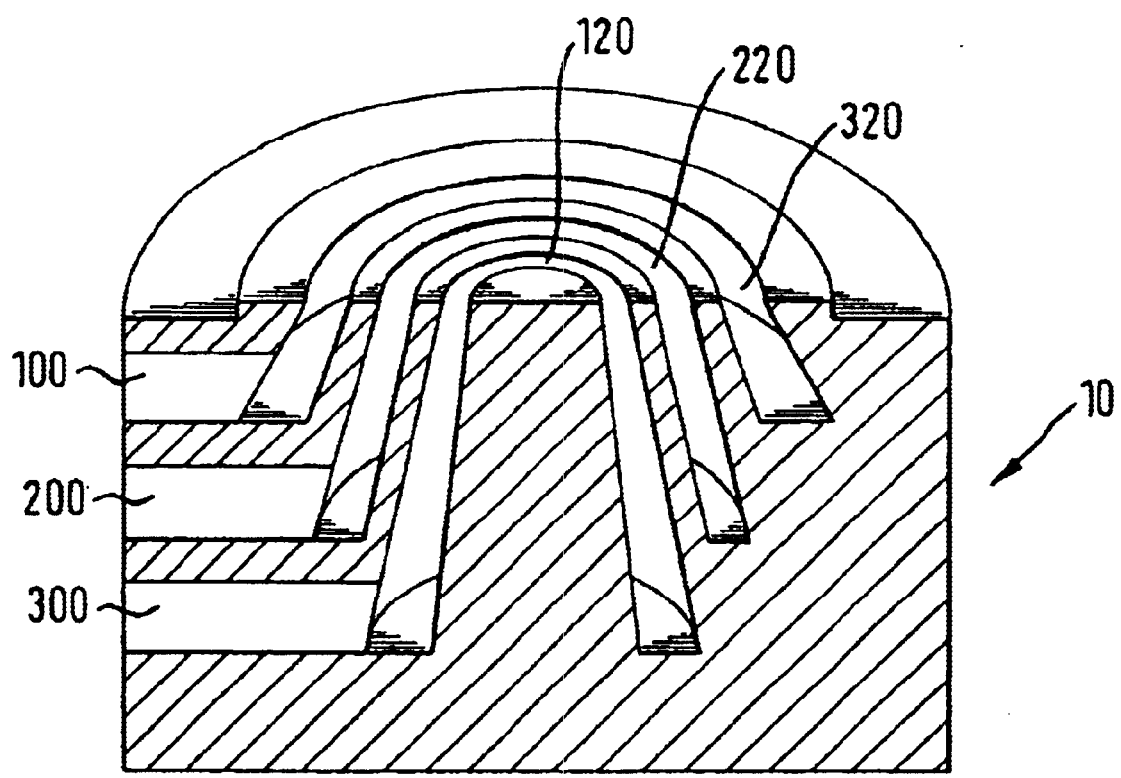
FIG. 3 shows an injection-moulding apparatus for a multilayer injection moulding method.
Figure 4A:
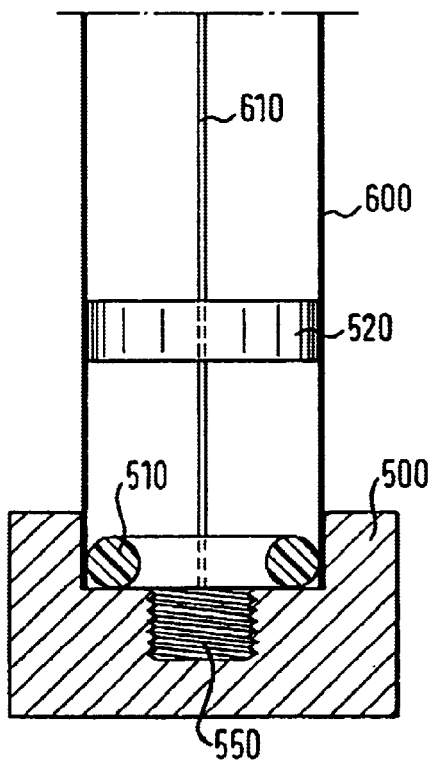
FIGS. 4a, B show diagrammatic representations of methods for producing tube preforms according to the prior art.
Figure 4B:
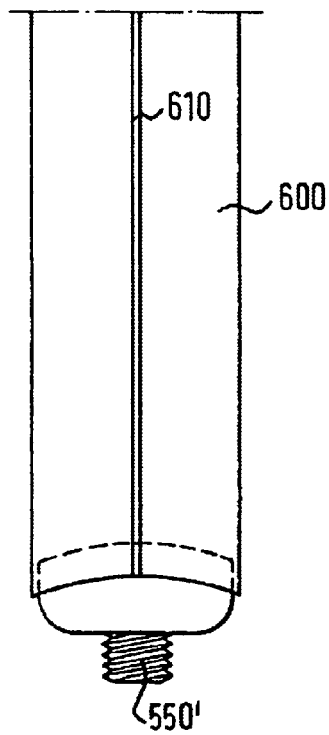

FIG. 3 is a diagrammatic perspective representation of an injection moulding nozzle 10 according to the invention, by means of which three-layered tube preforms can be produced. The injection moulding nozzle 10 has three annular gaps 120, 220, 320 which in each case inject a layer of the tube preform into the mould 30 (compare FIG. 1). The annular gaps 120, 220 and 320 are arranged concentrically and radially spaced from one another.

In addition, the annular gaps can have an axial spacing (not represented).

The annular gaps are connected by bores to a line system 100, 200 and 300 which is connected to the conveying devices 20i (compare FIG. 1). Of course, the number of feed lines, and thus of annular gaps is not limited to the number represented, but depends, as already described, on the number of layers desired. In the diagrammatic representation, the nozzle 10 is to be seen in one piece, but unipartite production can be very complicated, with the result that a multipartite design, for example through screwed or welded joints, can be more favourable for production.

After an inventive preform 40 (which can be either of single-layer or multilayer design and can have an open or closed end part 45) has been produced, the preform is advantageously moved to the filler, where the lateral surface region 46 is brought to its final dimensions using a secondary finishing method.

There is a particularly advantageous secondary finishing method for preforms with a closed end region 45 which can consist of any thermoplastic and, in particular, of PET, PP and Grivery (amorphous polyamide). In this method, the preform is heated in the region of the lateral surface, preferably using infrared radiation, until the lateral surface becomes soft. The preform is then introduced into a mould which with regard to the tube shoulder region, surrounds the preform in a self-closed fashion, and with regard to the lateral region prescribes the final shape of the later tube. Then, preferably with the aid of an air mandrel, compressed air is blown into the heated preform until the lateral surface has reached its final size and shape. Of course, in this case the wall thickness of the individual layers is reduced. It is possible using this method for the wall thickness of the layers, which consist of cost-intensive materials, to be greatly reduced (to below 50µm), with the result that a substantial cost component can be saved (up to 50% by comparison with conventional tubes) Furthermore, the reduction in wall thickness renders the tube containers softer and thus easier to handle.

Finally, in the last operation, the closed (as before) end region of the now finished tube is cut open perpendicular to the tube longitudinal axis (compare the line of section S in FIG. 2A), in order to provide the filling opening.

An alternative secondary finishing method in accordance with a further preferred embodiment of the present invention is a monoaxial expansion method, which is suitable for tube preforms with an open end region 45 (compare FIG. 2A). An example of such a method is a cold-forming method in which the tube preform 40 is stretched cold in its longitudinal direction. In this case, the lateral surface of the preform 40 is stretched to about 3.5 times or more of its length.

Since no moulding methods and cold stretching methods are sufficiently known to the average person skilled in the art, no attempt will be made here to consider them in detail.

Finally, it is pointed out that the examples represented above are merely explanatory and are not to be construed in a way which limits the extent of protection. The latter is to be defined only by the attached claims.

What is claimed is:

1. A method for producing fillable plastic tube bodies, comprising the following steps:
   (a) producing a tube body preform which has a closure region, a lateral surface region and a closed end region;
   (b) heating the tube body preform;
   (c) biaxially expanding the tube body preform in order to bring the tube body preform to its final shape and size; and
   (d) cutting open the closed end region of the tube body to form an open end for filling of the tube body; wherein step (a) includes:
   (1) filling at least first and second feeding containers respectively with a first thermoplastic material and a second thermoplastic material;
   (2) plasticizing the first and second thermoplastic materials in the respective feeding containers; and
   (3) injecting the first and second thermoplastic materials through an annular nozzle and into a mold cavity of an injection mold at a portion of the mold that forms the closure region to form adjacent layers of a tube body preform, the mold cavity corresponding to the shape of the closure region, lateral surface region and closed end region of the tube preform, the nozzle having radially inner and outer concentrically arranged annular nozzle gaps which are arranged in a common plane for effecting simultaneously injection of the first and second materials, the nozzle at the annular gaps contacting the portion of the mold that forms the closure region, and the delivery rate being essentially the same in terms of direction and magnitude for the first and second materials, with the result that the homogeneity of the first and second materials is maintained after the first and second materials leave the annular nozzle and also within the mold cavity.

2. A method according to claim 1, wherein step (c) includes using compressed air to expand the tube body preform.

3. A method according to claim 1, wherein step (b) includes heating the tube body preform by means of infrared radiation or hot air.

4. A method according to claim 1, further comprising a step of printing the biaxially expanded lateral surface region with a desired tube inscription.

5. A method as set forth in claim 1, further comprising the steps of filling the tube body with desired contents via the open end; and closing the open-end by means of welding.

6. A method according to claim 1, wherein the thermoplastic materials are selected to enable the open end to be closed by welding.

7. A method according to claim 1, wherein the thermoplastic material injected through the radially innermost annular gap of the nozzle is selected to be compatible with the fluid to be filled into the tube body.

8. A method according to claim 1, wherein at least one further material layer, which has a diffusion-inhibiting effect on the container fluid, is disposed between layers formed by the first and second materials.

9. A method according to claim 1, wherein the thermoplastic material which is injected through the outer annular gap is selected from a group consisting of polyethylene (PE), polyethylene glycol terephthalates, polyalkylene terephthalates (PET) and polypropylene (PP).

10. A method according to claim 1, wherein the thermoplastic material which is injected through the inner annular gap is selected from a group consisting of polyethylene (PE), polyethylene glycol terephthalates, polyalkylene terephthalates (PET) and polypropylene (PP).

11. A method according to claim 8, wherein the at least one further layer is selected from a group consisting of polyamide (PA), polyethylene (PE), polyalkylene terephthalates (PET), polypropylene (PP), ethylenevinyl alcohol (EVOH), polyethylene naphthalate, polyvinyl dichloride, polyethylene glycol terephthalates, and mixtures thereof.

12. A method as set forth in claim 1, further comprising the step of transporting to a remotely located filler the tube body preform after the tube body preform has been produced, and then at the filler performing steps (b) through (d).

13. A method as set forth in claim 1, wherein during step (c) the lateral surface region is biaxially expanded to a wall thickness that is below 50 $\mu$m.

14. A method as set forth in claim 1, wherein during step (c) the closure region stays in its original shape.

15. A method as set forth in claim 14, wherein the lateral surface region in its expanded state has a softness enabling a viscous material to be squeezed out of the tube when in use.

* * * * *